(12) United States Patent
Osypov

(10) Patent No.: US 6,424,920 B1
(45) Date of Patent: Jul. 23, 2002

(54) DIFFERENTIAL DELAY-TIME REFRACTION TOMOGRAPHY

(76) Inventor: Konstantin Sergeevich Osypov, 1625 Broadway, Suite 1300, Denver, CO (US) 80202

( * ) Notice: Subject to any disclaimer, the term of this patent is extended or adjusted under 35 U.S.C. 154(b) by 0 days.

(21) Appl. No.: 09/398,175

(22) Filed: Sep. 17, 1999

(51) Int. Cl.$^7$ ................................................ G01V 1/28
(52) U.S. Cl. ...................................................... 702/18
(58) Field of Search ............................. 367/73, 75, 54; 702/14, 17, 18

(56) References Cited

U.S. PATENT DOCUMENTS

| | | | |
|---|---|---|---|
| 4,298,966 A | 11/1981 | Ruehle | |
| 4,577,298 A | 3/1986 | Hinkley | |
| 4,695,984 A | 9/1987 | Paal | |
| 5,508,914 A | 4/1996 | Lee | |
| 5,587,968 A | * 12/1996 | Barr | ............................. 367/75 |

FOREIGN PATENT DOCUMENTS

GB     2090405     7/1982

OTHER PUBLICATIONS

Belfer, Igor and Landa, Evgeny, "Shallow Velocity–depth model Imaging by Refraction Tomography," Geophysical Prospecting, vol. 44, pp. 859–870 (1996).

Bell, Lee M. et al., "Application of Turning–Ray Tomography to the Offshore Mississippi Delta," 64th Annual Internat. Mtg., Soc. Expl. Geophys., Expanded Abstracts, vol. 94, pp. 1509–1512 (1994).

Bessonova, E.N., et al. "The Tau Method for the Inversion of Travel Times—I. Deep Seismic Sounding Data," Geophys., J.R. astr. Soc., vol. 36, pp. 377–398 (1974).

Bessonova, E.N., et al. "The Tau Method for the Inversion of Travel Times—II. Earthquake Data," Geophys., J.R. astr. Soc., vol. 36, pp. 87–108.

Docherty, P., "Solving for the Thickness and Velocity of the Weathering Layer Using 2–D Refraction Tomography," Geophysics, vol. 57, No. 10, pp. 1307–1318 Oct. 1992.

Ecoublet, P.O., et al., "Seismic Tomography and Migration Without Ray Tracing," Eur. Assoc. Geosc. Eng. 57th Conf. D007 Jun. 1995.

Enright, S.A., et al., "Towards Solving the Bent–Ray Tomographic Problem, Inverse Problems," vol. 8, pp. 83–94 (1992).

Garmany, J., et al., "Travel Time Inversion: A Geometrical Approach," J. Geopyhs. Res. vol. 84, pp. 3615–3622 Jul. 1979.

Gerver, M.L., et al., "Determination of a Seismic Wave Velocity from the Travel Time Curve," Geophys. J.R. astr., vol. 11, pp. 165–173 (1966).

Hampson, D. et al., "First–Break Interpretation Using Generalized Liner Inversion," 54th Annual Internat. Mtg., Soc. Expl. Geophys., Expanded Abstracts, vol. 84, pp. 532–534 Dec. 1984.

(List continued on next page.)

*Primary Examiner*—Donald E. McElheny, Jr.

(57) ABSTRACT

A new method for refraction tomography is provided that uses differential delay times. Different types of refracted waves including head waves and diving waves are inverted. First, traveltime/offset functions for station in the seismic survey are estimated from first-arrival picks. Next, the traveltime/offset functions are transformed into velocity/depth functions to make up a near-surface model. Then, long-period statics are calculated using the derived near-surface model. Finally, short-period statics are estimated by a surface-consistent decomposition of the traveltime residuals.

22 Claims, 4 Drawing Sheets

OTHER PUBLICATIONS

Hart, D., "Improving the Reliability of First–Break Picking via Neural Networks," 66th Ann. Internat. Mtg., Soc. Expl. Geophys., pp. 1662–1665 (1996).

Lau, A., et al., "Unconstrained Near–Surface Velocity Inversion of Linear Moveout Velocities and Its Impact on Structural Mapping," 69th Ann. Internat. Mtg. Soc. Expl. Geophys, pp. (19 ).

Mithal, R., et al., "A Method of Obtaining a Velocity–Depth Envelope from Wide–Angle Seismic Data," Geophys. J. R. astr. Soc., vol. 89, pp. 965–985 (1987).

Orcutt, J.A., et al., "Joint Linear, External Inclusion of Seismic Kinematic Data," J. Gephys. Research, pp. 2649–2660 (1980).

Orcutt, J.A., et al., Comment concerning "A Method of Obtaining a Velocity–Depth Envelope from Wide–Angle Seismic Data, by R. Mithal and J. B. Diebold", p. 209 (1987).

Mithal, R., Reply to the 'Comment concerning "A Method of obtaining a Velocity–Depth Envelope from Wide–Angle Seismic Data, by R. Mithal and J. B. Diebold'" p. 211 (1987).

Osypov, K.S., et al., "Data Based Regularization in Travel–Time Tomography," 66th Ann. Internat. Mtg., Soc. Expl. Geophys., pp. 2003–2006 (1996).

Osypov, K.S., "Comparative Study Between 3–D Diving–Wave Tomography and Head–Wave Refraction Methods," 68th Ann. Internat. Mtg., Soc. Expl. Geophys., pp. 1222–1225 (1998).

Ryzhikov, G., et al., 3D Nonlinear Inversion by Entropy of Image Contrast Optimization: Nonlinear Processes in Geophysics, vol. 2., pp. 228–240 (1995).

Stark, P.B., "Rigorous Velocity Bounds from Soft $\tau(p)$ and $X(p)$ Data," Geophys. J. R. astr. Soc, vol. 89, pp. 987–996 (1987).

Stark, P.B., "Smooth Profiles from $\tau(p)$ and $X(p)$ Data," Geophys. J. R. astr. Soc, vol. 89, pp. 997–1010 (1987).

Taner, T.M., et al., "A Unified Method for 2–D and 3–D Refraction Statics," Geophysics, vol. 63, No. 1., pp. 260–274 (1998).

Zhu, X. et al., "Tomostatics: Turning–Ray Tomography + Static Corrections," The Leading Edge, vol. 11., No. 12, pp. 15–18, Dec., 1992.

* cited by examiner

DIFFERENTIAL DELAY-TIME REFRACTION TOMOGRAPHY

BACKGROUND OF INVENTION

1. Field of Invention

The present invention relates to seismic exploration, and more particularly refraction tomography. A specific example is for correction of near-surface anomalies.

2. Description of the Prior Art

An important problem in seismic exploration is that of distortions in seismic images due to near-surface velocity anomalies. Therefore, the analysis of refraction data for statics estimation to reveal information about the near surface, and correspondingly about statics, is very important in seismic processing.

Near-surface velocity anomalies produce severe distortions in seismic images. If one knew the structure of these anomalies, the best way to tackle this problem would be to perform wave-equation datuming or depth migration from the surface through the known structure. However, 3-D prestack depth imaging and datuming are computational challenges. Therefore, statics applications assuming surface-consistent ray propagation through the near surface have remained the main tool to account for near-surface anomalies.

The analysis of the stacking responses of reflection data works better for estimating the short-period part of statics (so called residual statics), while estimation of the long-period statics using reflection data alone is very unstable and inefficient. Therefore, analysis of refraction data for statics estimation to reveal more information about the near surface, and correspondingly about statics, is customary in conventional seismic processing.

The generalized reciprocal method has been widely applied to 2-D data. Unfortunately, for 3-D seismic the reciprocal method is difficult to apply due to the lack of reciprocal data. The idea of delay times also appeared useful for 3-D refraction statics calculations. The delay-time method assumed a near-surface model of locally flat layers on the scale of offset range. First arrivals were assumed to be the onset of head waves propagating along refracting interfaces of these layers. First arrival pick times were decomposed into delay times and refracting-layer velocities. Delay times were then converted to layer thicknesses and velocities assuming a critical angle of incidence on the refracting layers. A technique known as Refraction MISER® available from the assignee of the present application is an example of the delay time method.

The delay-time method is also used in other approaches, such as Generalized Linear Inversion (GLI) and head-wave refraction tomography. In these methods, instead of the two-step inversion via delay times, traveltimes were inverted directly for layer thicknesses and velocities. However, these methods also had to deal with the problem of velocity/depth ambiguity. To address this issue, it was common practice to fix the weathering velocity prior to depth estimation. Incorporation of reflection data for joint inversion with refraction data could at times reduce the velocity/depth ambiguities. Unfortunately, near-surface reflections were very difficult to pick in normal production data.

One of the main problems with head-wave methods has been that in areas with complex geology and rough terrains the simple model typically employed was not sufficient to explain important data features. Moreover, in order to fit the observed nonlinear move out of first arrivals one had to either limit the offset range or include more layers in the model. Both approaches made inversion even more unstable and ambiguous.

Theoretical amplitudes of head waves have been expected to be several orders of magnitude less than body waves, and therefore head waves should be poorly represented in the data. On the other hand, even a small positive vertical velocity gradient could produce a variety of interference waves or modes that included diving (turning) waves with much larger amplitudes than head waves. The kinematics of diving waves are nonlinear. In most cases, diving-wave modeling fitted the observed first-arrival moveouts better than head-wave modeling.

The reasons discussed above made diving-wave tomography, assuming first arrivals as on-sets of diving waves, a very attractive alternative to head-wave methods for statics calculation. In this approach the medium was parameterized as a number of cells, diving rays were traced through the model, and traveltime residuals were back-projected or inverted for slowness perturbations in every cell crossed by rays. Since diving waves fitted the nonlinear moveout of first arrivals better than head waves, broader offset ranges could be included for processing, reducing ambiguity in the inversion. However, limiting the incidence-angle aperture at the weathering layer still made inversion for parameters of this layer ambiguous. Another problem with tomography was the huge number of unknowns, especially for 3-D surveys. This has required special efforts to make the inversion feasible and stable.

Previous tomographic approaches have used head waves and diving waves. Head-wave based methods have in general been robust because the model parameters depend almost linearly on the observed traveltimes. In contrast, diving-wave based methods incorporated a wider offset range, and the relationship between the model parameters and the traveltimes became nonlinear because of a significant dependence of the processing on the assumed ray paths. This has made tomographic results sensitive to the initial model. The tomographic solution could be stabilized by using a Fourier parameterization, but the solution remained sensitive to the initial model because of the use of ray tracing.

Refraction tomography would be more desirable, if one were able to remove the initial model dependency due to ray tracing. It has been shown that traveltime inversion possesses an inherently linear formulation in the tau-p domain. However, practical implementation of the tau-p transform for traveltimes has not been straightforward, especially for the case of 3-D survey data.

Other approaches have been proposed for avoiding ray tracing in tomography. These methods used a spatial traveltime decomposition constrained by the eikonal equation. The eikonal method was based on a vertical seismic profile and cross-hole transmission geometry. Although well suited for vertical seismic profiling and cross-hole geometries, these techniques were difficult to apply to refraction data.

It can thus be seen that the conventional cell parameterization used in tomography was, so far as is known, generally ineffective for modeling near-surface geological structures. Further, it introduced a large number of unknowns. In the cell-based formation, the tomographic problem was ill-posed and required a regularization that was not straightforward. Furthermore, the quality of the initial model required for ray tracing and nonlinear inversion depended on an analysts expertise, and this could ultimately lead to a bias in the final solution.

SUMMARY OF INVENTION

Briefly, the present invention performs refraction tomography of seismic data using differential delay times. According to the present invention, seismic data obtained during a seismic survey from a plurality of seismic stations are processed to remove the effect of statics from the data. Traveltime/offset functions are formed for the seismic stations from first-arrival picks obtained from the data. The traveltime/offset functions are transformed into velocity/depth functions to derive a near-surface model. Long-period statics in the data are then determined from the derived near-surface model. Short-period statics are estimated by surface-consistent decomposition of the traveltime residuals. The determined long-period and short-period statics are then removed from the seismic data, which are then available for display or subsequent processing in order to be analyzed.

The techniques of the present invention estimate the near surface velocity model and produce static corrections by means of first-break traveltime tomography without ray tracing. The traveltime inversion implemented according to the present invention involves several steps. First, the data are selected for inversion from a specified offset range and adjusted, if necessary. Then, a 3-D function is estimated from first-arrival picks using a method combining 1-D modeling and nonparametric regression. Next, differential delay times are used for calculation of local velocity/depth functions that make up the near-surface model. Then, long-period statics are calculated using the derived model, Short-period statics are estimated by surface-consistent decomposition of the traveltime residuals. The short-period and long-period statics may then be removed from the seismic data.

The present invention combines an approach of unconstrained spatial traveltime decomposition with a linear inversion in tau-p domain. The present invention performs no explicit ray tracing. The approach used combines the robustness of head-wave (delay-time) methods, as it does not require an initial model or ray tracing, and the flexibility of diving-wave tomography, as it inverts both head and diving waves over the complete offset range.

DESCRIPTION OF THE PREFERRED EMBODIMENT

Figure 1:
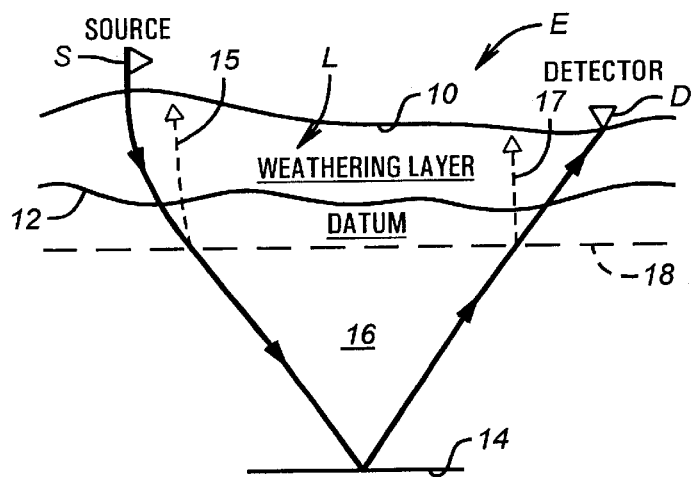
FIG. 1 is a schematic diagram of a seismic survey illustrating the presence of statics in the survey.

In the drawings, a cross-sectional view of a weathering layer L beneath a portion 10 of the earth's surface E is shown in the vicinity of a subsurface seismic survey. Seismic energy is imparted into the earth at a shotpoint S, typically at some suitable depth within the weathering layer L. The seismic energy travels outwardly from the shotpoint S through the weathering layer L and therefrom through a base 12 or interface between the weathering layer L and deeper subsurface formations. The seismic energy travels into the earth E and portions of the energy are reflected by interfaces, such as one indicated at 14, between subsurface geologic formations indicated generally with reference numeral 16. Reflected energy travels upwardly from the reflectors through the subsurface formations 16 through the weathering layer L to a detector or array of detectors indicated schematically at D located at or near the earth's surface 10. The responses of the reflectors whether over a two-dimensional array (as shown) or three-dimensional array are then sensed and processed. It should also be understood that the present invention may be used with marine seismic survey data, as well. The purpose of reflection surveying is to identify subsurface formations or features of interest.

However, the weathering layer L is not of uniform thickness or elevation and the composition of the materials and their density within the layer L varies. These effects are generally referred to as statics. Generally, there are two categories of statics. Long period statics are generally caused by variations in the thickness and velocity of the weathering layer L above a datum level 18. Short period statics due to variations in the weathering layer L and also in surface coupling of the source S and the detector D to the earth.

In seismic data processing, it is desirable to correct for these statics and eliminate as much as possible the effects of variations in the weathering layer L and other statics on the seismic data. It is highly desirable to have the seismic data be in a form as if it had resulted from a survey conducted on a substantially flat plane or datum 18 at a constant elevation in the earth. To compensate for statics, it is necessary to determine the amount of time delay introduced by travel of seismic energy above the datum level 18 and then remove the effects of this time delay from the seismic data. In effect, static correction compensates for elevation differences of the source S and detector D above the datum level 18, for differences in surface coupling of the source and receivers, and for variations in the density of the earthen materials above the datum level 18.

Refraction tomography is a method for finding the velocity distribution from first-break traveltimes. Refraction tomography is the formation of models of subsurface features based on the response of the earth formations to refraction seismic waves. Refraction waves are formed when a portion of the seismic energy arrives at an interface between two formations at what is known as the critical angle such as at a location 15. The critical angle is based on the relative seismic velocities in the layers above and below the particular interface and travels along such an interface. The refraction seismic energy wave travels along that interface until a location 17 where the refraction wave again exits at the same critical angle to travel upwardly and be sensed at the receiver R. Detection of the arrival of such a refraction wave is known as a first arrival pick. There are two main classes of refraction tomography methods. The first class deals with a near-surface model formed of locally flat layers on the scale of offset range, or distance between the locations 15 and 17.

Figure 2:
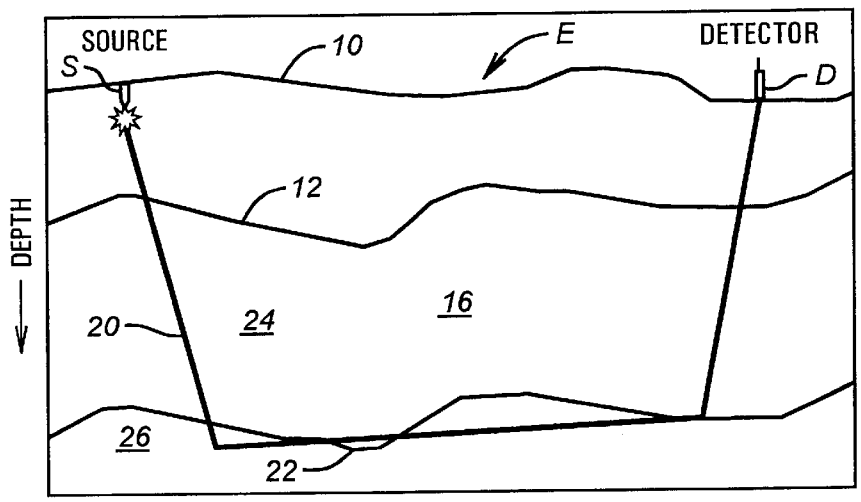
FIG. 2 is a schematic diagram of travel of head waves through the earth during seismic surveying.

FIG. 2 illustrates schematically the travel path 20 of a head wave like that described with respect to FIG. 1. The head wave 20 travels from a source S to a detector D along an interface 22 between formations 24 and 26. The refraction path 20 of the head wave is depicted as a straight line in FIG. 2 although actually it is along the interface 22. First arrivals are assumed to be the onset of head waves propagating along refracting interfaces between such layers.

The kinematics of head waves are linear. First arrival pick times are decomposed into delay times and refracting-layer velocities. Delay times are then converted to layer thicknesses and velocities assuming a certain value for a critical angle of incidence on the refracting layers. A processing technique known as Refraction MISER® available from the assignee of the present application is an example of this approach. There are also other known implementations of head-wave refraction in the prior art.

The second class of refraction tomography deals with what are known as diving or turning waves, as shown in a model (FIG. 3) in the same location as that of FIG. 2. Diving waves exhibit a vertical velocity gradient. First-arrivals at the detector D from the source S are assumed to be the onset of diving or turning waves, as shown schematically at 28. The kinematics of diving waves are nonlinear. The medium is parameterized as a number of cells, rays are traced through the model. Residuals between observed and calculated traveltimes are backprojected or inverted for slowness perturbations in every cell crossed by rays. A number of different implementations of diving-wave refraction tomography are described in the literature.

Figure 3:
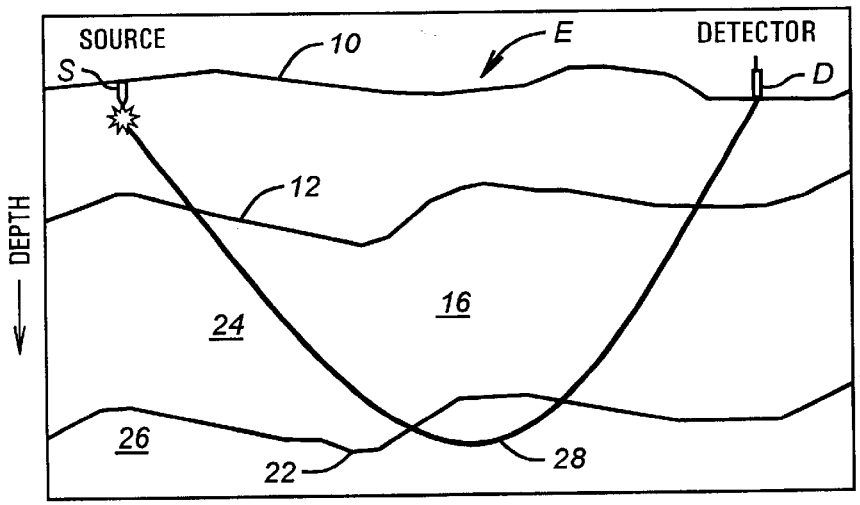
FIG. 3 is a schematic diagram of travel of diving waves through the earth during seismic surveying.

One of the main problems with these methods is that actual earth formations are more complex than shown in FIGS. 2 and 3. In areas with complex geology and rough terrains the simple model typically employed is not sufficient to explain important data features. Moreover, in order to fit the observed nonlinear moveout of first arrivals one has to either limit the offset range or include more layers in the model. Both approaches make inversion even more unstable and ambiguous. However, head-wave based methods are in general robust because the model parameters depend almost linearly on the observed traveltimes. In contrast, for the diving-wave based methods that incorporate a wider offset range, the relationship between the model parameters and the traveltimes becomes nonlinear because of its significant dependence on the ray paths. This makes tomographic results sensitive to the initial model.

Taking the above into account, the method of the present invention does not rely on an explicit model parameterization and thus avoids the problems mentioned above. The present invention obtains a measure of statics through a traveltime inversion which involves three stages.

In the first stage, traveltime data are divided into a set of offset subranges. The traveltimes within each subrange are spatially decomposed so that an observed traveltime pick, $t(R_s, R_d)$, for the source and detector with coordinates $R_s$ and $R_d$, respectively, is modeled by:

$$t(R_s, R_d) = \frac{T(R_1, X) + T(R_2, X)}{2}$$

were the offset is X, and $$X = |R_s - R_d|$$

Figure 4:
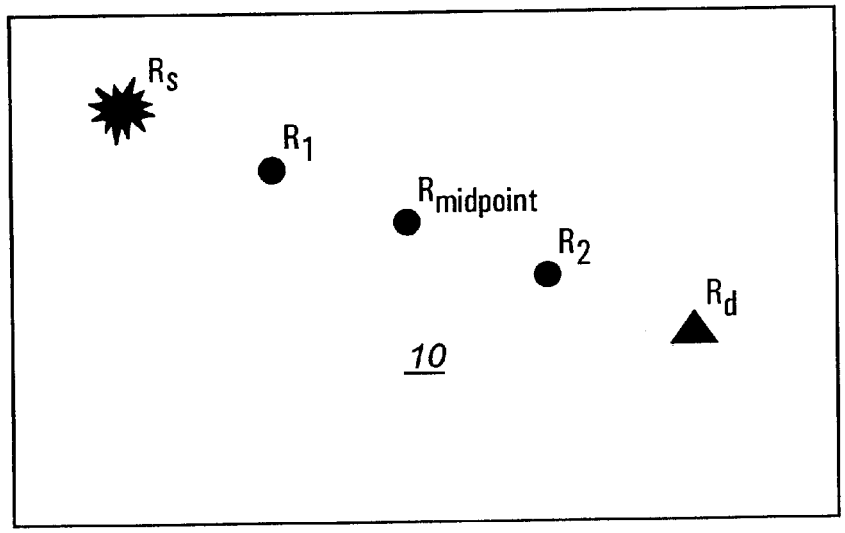
FIG. 4 is a plan view of a portion of the earth's illustrating locations of sources and receivers during a seismic survey.

Here, T(R, X) is the modeled traveltime function for surface location R, the coordinate vector defining the surface location. The coordinates $R_1$ and $R_2$ correspond to the central points between coordinates $R_s$ for source S and midpoint, and coordinate $R_d$ for detector D and midpoint, respectively, as seen in FIG. 4.

The traveltime decomposition is in the preferred embodiment based on a hybrid of 1-D and third order regression and a nonparametric regression. First, for each offset sub-range a two-dimensional spatial grid is defined. Then, the residuals between the adjusted and the one-dimensional modeled picks are back-projected onto the grid. Generally, several iterations of this procedure are used.

As an alternative, the traveltime decomposition may also be performed by several iterations of mapping $t(R_s, R_d)$ onto T(R, X) using a Kalman filter as a back-projection recursion for model updating. Properties of the Kalman filter in application to tomography are described, for example, in "Traveltime Tomography Using Regularized Recursive Least Squares," 1998, *Geophysical J. Int.*, Vol. 134, pp. 545–553, by Yao et al., of which applicant is co-author.

A spatial smoothing in the decomposition is implied by use of a Gaussian weighting similar to the diffusion regularization introduced as described in "3D Nonlinear Inversion by Entropy of Image Contrast Optimization," 1995, *Non-Linear Processes in Geophysics*, Vol. 2, pp. 228–240, by Ryzhikov et al. As a result of the decomposition, the estimates of T(R, X) for all offset subranges form a spatially-varying traveltime/offset function.

In the second stage of the inversion, apparent velocities and delay times are calculated from the estimated traveltime/offset function; where $X_i$ is the central offset for the $i^{th}$ offset subrange.

$$V_i^R = \frac{X_{i+1} - X_i}{T(R, X_{i+1}) - T(R, X_i)}$$

and $\tau_1^R$ is the delay time defined as $$\tau_i^R = \frac{T(R, X_i) - \frac{X_i}{V_i^R}}{2}$$

Thus, a 3-D tau-p function has been estimated from the decomposition of first-break traveltimes.

In the third stage, the derived apparent velocities may be used to calculate $Z(V_i^R)$, the penetration depth of the refracted wave, for all stations by means of the following formula:

$$Z(V_i^R) = \frac{1}{\pi} \sum_{j=0}^{i} \cosh^{-1}\{V_j^R / V_i^R\}(X_{j+1} - X_j),$$

where $X_0 = 0$ and $Z(V_0^R) = 0$. This formula assumes a monotonic increase of $V_i^R$ with offset, and correspondingly with depth, resulting in velocity inversions being ignored. Another and more preferred formulation uses differential delay times and derived apparent velocities to calculate $Z(V_i^R)$ by sequential estimation of layer thickness from the top to the bottom of the model:

$$\Delta Z(V_i^R) = \frac{\Delta \tau_i^R \cdot V_i^R}{\sqrt{1 - \frac{V_i^R}{V_{i+1}^R}}}$$

where differential delay time $$\Delta \tau_i^R = \tau_{i+1}^R - \tau_i^R$$

For either method, the apparent velocity $V_i^R$ represents the instantaneous interval velocity at the depth $Z(V_i^R)$, corresponding to the turning depth of a diving wave or the refractor depth for a head wave.

The values of $Z(V_i^R)$ for all offset subranges form a velocity/depth function below a given surface point. The velocity/depth functions for a set of control points compose a near-surface model estimate. Thus, with the present invention use of the geometrical properties of the refracted waves, coupled with the derived velocity model, yields a tomographic reconstruction without explicit ray tracing.

The spatial resolution of $V_i^R$ is constrained by the smoothing imposed on the traveltime decomposition, and in the limit corresponds to $X_i/2$. The optimal degree of smoothness depends on the data noise level and may be chosen according to a data-based regularization approach. An example of this technique is disclosed in an article of which applicant is co-author: "Data Based Regularization in Traveltime Tomography," 1996, Osypov and Scales, 66th Annual International Mtg., Society of Exploratory Geophysicists, pp. 2003–2006.

Once derived, the velocity model is used for statics calculation. The static at a particular station is calculated as the difference between two terms. The first term is the vertical traveltime through the velocity model from the station elevation down to an intermediate datum. The second term is the vertical traveltime from the intermediate datum up to the final datum using a replacement velocity. These statics are long-period as they correspond to the smoothed velocity model. The short-period statics are estimated by an iterative surface-consistent decomposition of the traveltime residuals between the observed and modeled first-arrival traveltimes.

The method of the present invention was applied to a 3-D dynamite survey in the thrust-belt region of the Northwest Basin of Argentina. This survey includes extra control for the near surface in the form of uphole-time measurements for twelve holes of 150 m depth. Topographic variations are about 150 m within the 100 km² of the survey. For study purposes no information from the uphole experiment was used in the methods applied. The same pick times were also inverted using a ray-traced diving-wave tomography algorithm.

Figure 5:
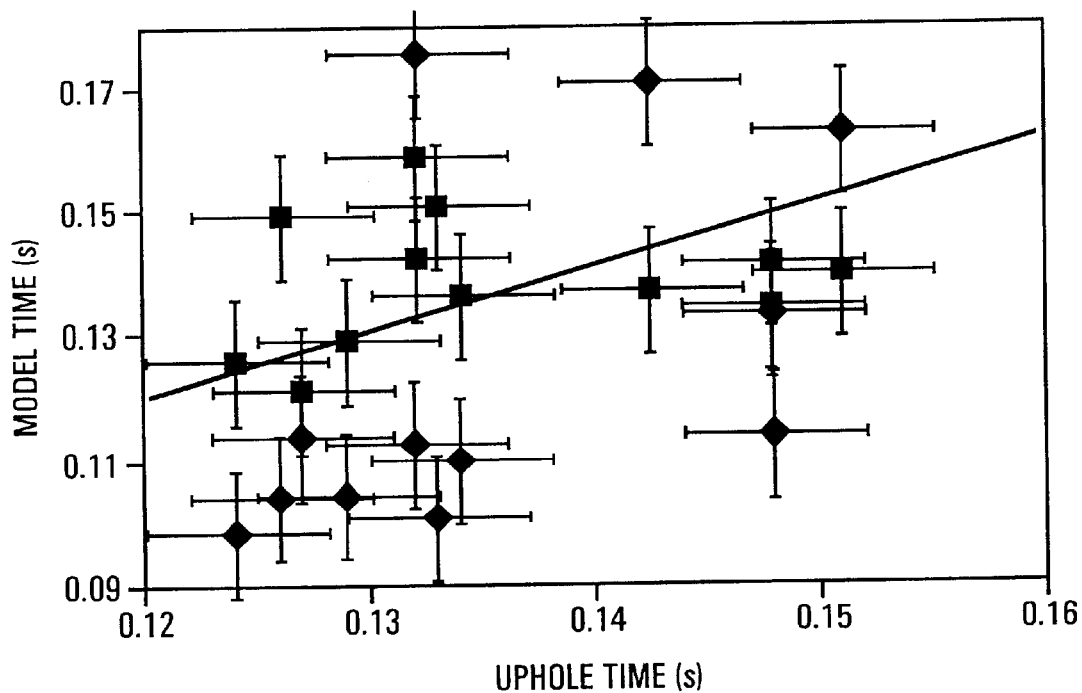
FIG. 5 is a comparative plot of data results obtained with the present invention as compared to results obtained with ray tracing.

FIG. 5 shows the observed uphole times for twelve 150 m holes versus the one-way traveltimes for the velocity models estimated by the two tomographic methods. Error bars reflect the uncertainties of picking. Estimates (squares) obtained with the present invention can be seen to correlate better with the uphole times than the results of the prior art ray-traced method (diamonds). This ray-traced method is described in an article by applicant: "A Comparative Study Between 3-D Diving Wave Tomography and Head Wave Refraction Methods." 1998, Osypov, 68th Ann. Internat. Mtg., Society of Exploratory Geophysicists, pp. 1222–1225. This article showed that the ray-traced diving-wave tomography results provided a better match to the uphole control than head-wave based solutions.

Figure 6A:
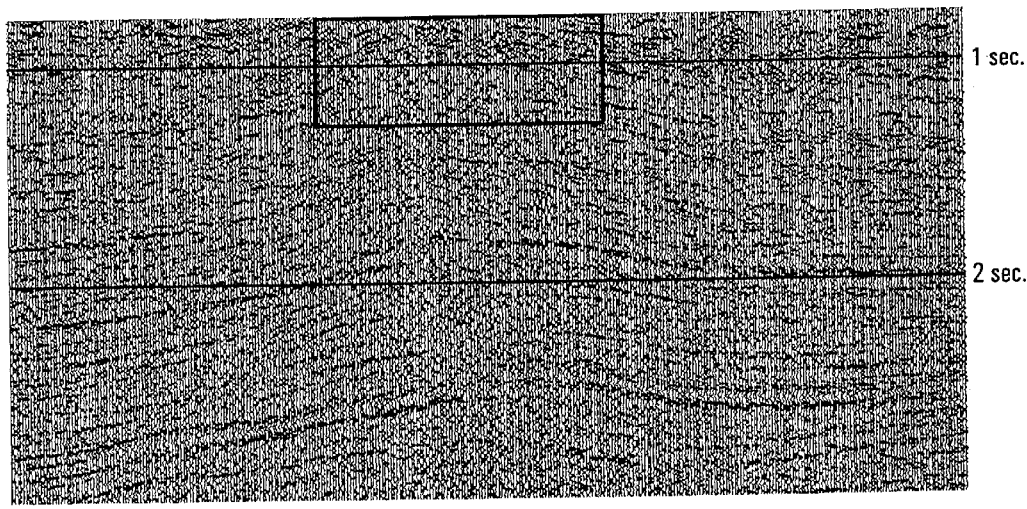
FIGS. 6A, 6B, and 6C are plots seismic data depicting results before processing and after processing with two different techniques.
Figure 6B:
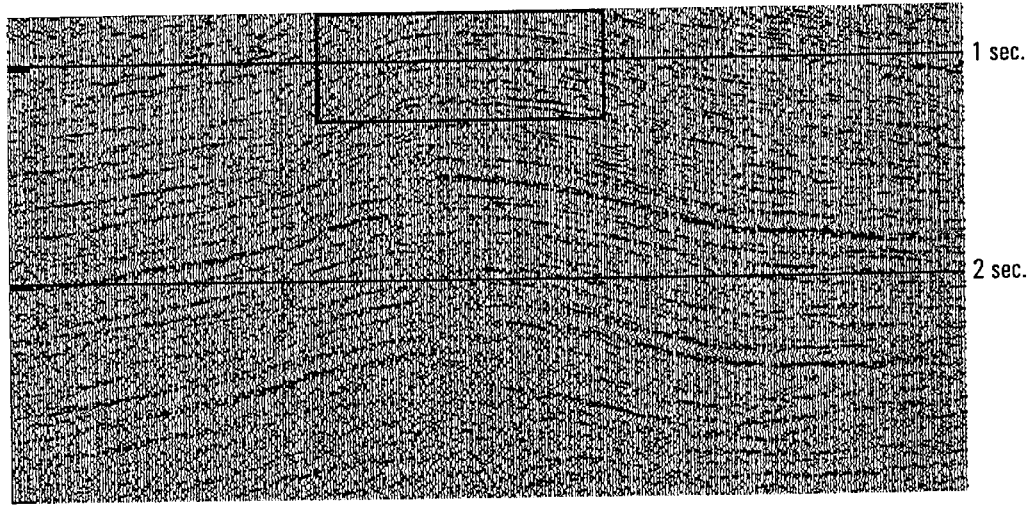
Figure 6C:
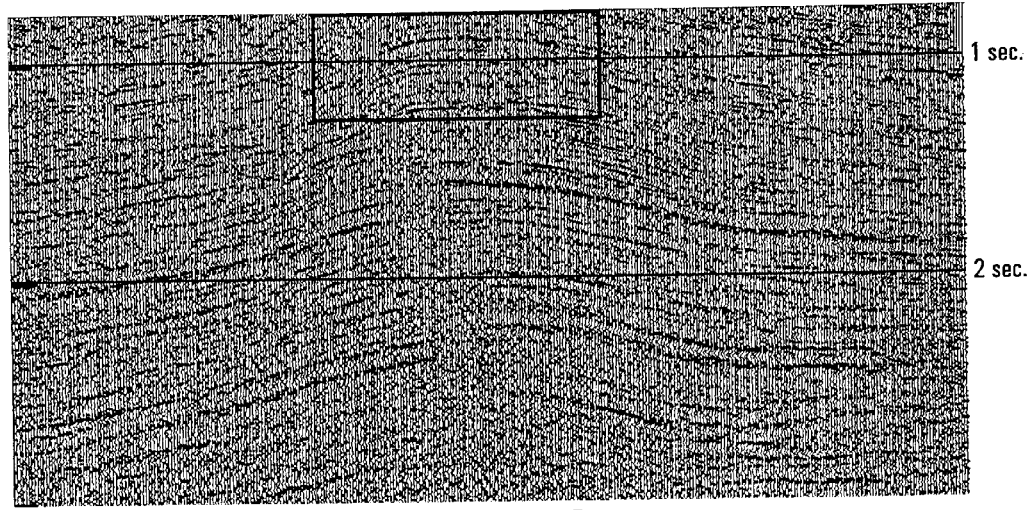

FIG. 6A is an inline brute stack of seismic data with conventional field statics applied. The severe corruption by static anomalies at an area indicated at 60 corresponds to the part of the stack used for the comparative study based on the ray-traced diving-wave tomography algorithm according to applicant's 1998 article discussed above. FIG. 6B is an inline stack of the same data as FIG. 6A after application of the ray-traced diving-wave tomography. FIG. 6C shows results from data processed according to the refraction tomography of the present invention. The overall stack quality of the present invention is comparable, if not better, than for the display of FIG. 6B. Additionally, the timing of events on the left part of the stack of FIG. 6C is different by about 50 ms due to differences in the long-period statics estimates. These statics differences partly correspond to the differences in the time-depth estimates in FIG. 5. This is an example of the velocity ambiguity that influenced the results because of the noise contamination of the near-offset data. Finally, the present invention has an advantage in that it required only a few test runs with different smoothing constraints, as compared with the ray-traced result of FIG. 6B that was chosen as the best from a large set of solutions obtained for different initial models.

Figure 7:
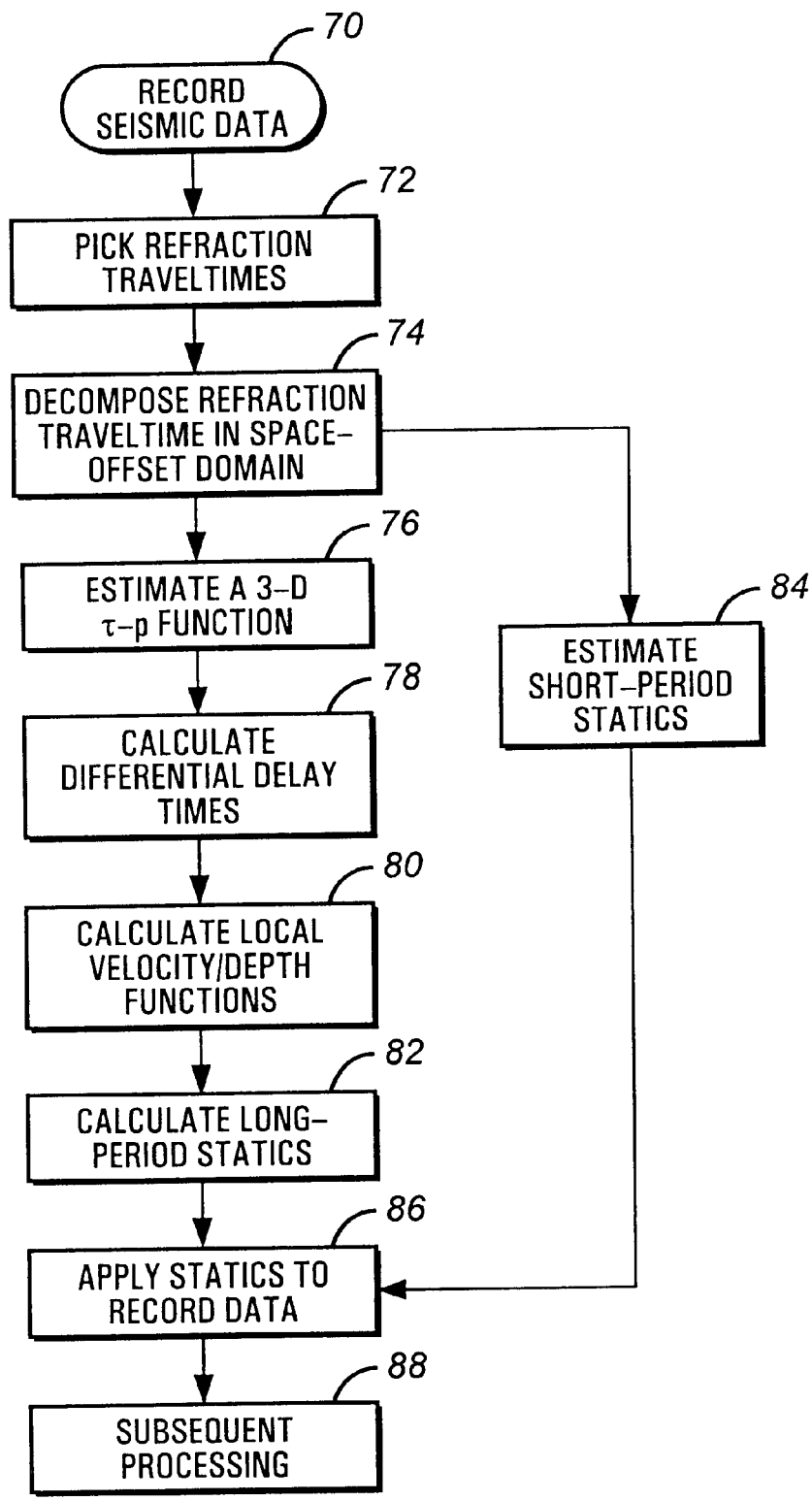
FIG. 7 is a schematic diagram of a sequence of steps for processing seismic data according to the present invention.

In FIG. 7, a process flow diagram of a sequence of steps according to the present invention is set forth. The result of this processing permit results like those of FIG. 6C to be obtained from data processed with conventional field statics applied, like those shown in FIG. 6A, and in contrast to the time-consuming, computationally intensive ray tracing prior art techniques, with results shown in FIG. 6B.

During step 70, field seismic data for a three-dimensional seismic survey are recorded. The seismic data can be recorded during a land seismic survey or a marine seismic survey in a body of water. The remaining processing steps set forth below may be performed in a suitable Unix-based computing platform. For delay time decomposition, in water surveys the data are adjusted for the stations by moving them to the water bottom using water velocity. For land surveys, the data are adjusted to the free surface using uphole times. Long period and short period statics are, however, determined based on their original positions.

During step 72, refraction travel times for both head waves and diving waves are selected or picked. Next, during step 74 the picked refraction traveltimes are decomposed in the space-offset domain. The traveltime data are divided into a set of offset subranges and spatially decomposed as described above. As indicated at step 76, a resultant estimate of a three-dimensional tau-p function is then formed in the manner previously described.

During step 78, differential delay times are then calculated and the related apparent velocities are determined. From the derived apparent velocity results obtained during step 78, the values in $Z(V_i^R)$ of local velocity/depth functions below each of the surface point of interest are obtained during step 80. This may be done using either of the methods previously described. The velocity/depth functions $Z(V_i^R)$ for a set of control points are then assembled during step 82 so that long-period statics are calculated.

In addition, during a step 84 after the decomposition step of 72, the resultant or remaining residual statics are used to form an estimate of short-period statics. The short-period statics are preferably estimated by an iterative surface-consistent decomposition of the traveltimes between the observed and modeled first-arrival traveltimes. In addition to a weighted back projection of this type, it should be understood that other methods could be used. Other short-term static estimation techniques such as the Gauss-Zeidel or the conjugate gradient approaches may be used, as well.

After determination of the long-period statics during step 82 and the short-period statics during step 84, the statics so determined are then applied to the recorded data during step 86. The statics-corrected data resulting from step 86 are then available for subsequent conventional processing and display for the purposes of analysis as indicated at step 88. The displays so formed are exemplified in FIG. 6C and may be made by any suitable, commercial available seismic data display system or station.

Refraction tomography with the present invention is thus a stable and flexible method of modeling the near surface and producing static corrections. This method of traveltime inversion differs from conventional tomographic approaches in that it performs no explicit ray tracing. The approach combines the robustness of delay-time methods, as it does not require an initial model or ray tracing, with the flexibility of tomography, as it inverts both head and diving waves over the complete offset range.

Inverting refraction data over the complete offset range minimizes velocity/depth ambiguity. However, near-offset refraction data are often noisy or unavailable. In this case, a priori information, such as uphole times, well data, gravity data, and any geologic knowledge, may be used with the present invention to constrain the velocities of the shallowest part of the model.

One of the problems in tomography is the handling of velocity inversions or "blind" zones. In general, inverting for low-velocity zones is ambiguous. Nevertheless, with the present invention a low-velocity layer thickness may be estimated using differential delay times in the manner described above.

For all refraction methods, the quality of results significantly depends on the quality of picks. The method of the present invention produces statistical estimates of the model errors based on analyses of the picking errors. Estimates of this type may be obtained, for example, from the output of a conventional neural network first-break picker.

Fundamental issues, inherent for all refraction statics methods, include the difference in velocities between refracted and reflected waves, and the violation of surface consistency in the areas containing thick permafrost or deep water on top of mudflows. The former issue is partly due to the deviation of picked times from the onsets of "true" arrivals, and partly to the differences between group velocities of refracted interference waves and velocities of reflected waves. The issue of violation of surface consistency may be overcome by applying a special ray-based correction implemented according to the present invention or by using wave-equation datuming or imaging from the surface through the tomographic model.

From the foregoing it can be seen that the three-dimensional traveltime decomposition according to the present invention is done with both parametic and non-parametric regression, rather than in a completely parametric approach. With the present invention, the traveltime decomposition is more flexible and less computationally expensive. The present invention is performed on surface refraction data and is not limited to particular geometries only present in vertical seismic profiling and cross-hole geometries. Also, constraints imposed the eikonal equation approach of the prior art are avoided.

Further, the present invention accomplishes one-dimensional inversion in the tau-p domain. It inverts differential delay times rather than full delay times (tau/2). This reduces errors which may be caused by three-dimensional structures. The present invention is thus better suited for three-dimensional tomography, using the three-dimensional tau-p function obtained from the traveltime decomposition. Further, the preferred regularized back-projection avoids the more expensive linear or quadratic programming approaches.

While the present invention has been described in specific steps, it is contemplated that those skilled in the art may substitute comparable steps, additions or modifications without departing from the scope of the present invention which is limited only by the appended claims.

What is claimed is:

1. A method of processing seismic data obtained during a seismic survey from a plurality of seismic stations to remove the effect of statics from the data, comprising:

forming traveltime/offset functions for the seismic stations from first-arrival picks obtained from the data;

transforming the traveltime/offset functions into velocity/depth functions to derive a near-surface model;

determining long-period statics in the data from the derived near-surface model; and removing the determined long-period statics from the seismic data.

2. The method of claim 1, wherein traveltime residuals remain as a result of determining long-period statics, and further including:

forming an estimate of the short-period statics in the seismic data; and removing the estimates formed of the short-period statics from the seismic data.

3. The method of claim 2, wherein forming an estimate of the short-period statics comprises:

performing a surface-consistent decomposition of the traveltime residuals.

4. The method of claim 1, wherein forming traveltime/offset functions includes:

dividing the seismic data into a group of offset subranges.

5. The method of claim 4, wherein forming traveltime/offset functions further includes:

performing a spatial decomposition of the traveltimes for each of the groups of offset subranges to obtain modeled traveltime picks for each of the offset subranges.

6. The method of claim 5, wherein performing a spatial decomposition comprises:

determining an observed traveltime pick $t(R_s, R_d)$ for a source with vector coordinates $R_s$ and a receiver with vector coordinates $R_d$, according to the model $$t(R_s, R_d) = \frac{T(R_1, X) + T(R_2, X)}{2}$$

where $T(R, X)$ is the modeled traveltime function for surface location $R$, and $R_i$ corresponds to a central point between the source and the midpoint, and $R_2$ corresponds to a central point between the receiver and the midpoint.

7. The method of claim 5, wherein forming the estimated traveltime/offset function includes:

determining an apparent velocity from the traveltime pick for each of the offset subranges.

8. The method of claim 7, wherein determining an apparent velocity comprises:

determining an apparent velocity $V_i^R$ according to an estimated traveltime/offset function:

$$V_i^R = \frac{X_{i+1} - X_i}{T(R, X_{i+1}) - T(R, X_i)}$$

where $X_i$ is the central offset in the $i^{th}$ of the offset subranges.

9. The method of claim 7, further including:

determining a delay time for each of the offset subranges.

10. The method of claim 9, wherein determining a delay time comprises:

determining a delay time $\tau_i^R$, where $$\tau_i^R = \frac{T(R, X_i) - \frac{X_i}{V_i^R}}{2}$$

11. The method of claim 9, further including:
forming a three-dimensional tau-p function from the decomposition of first-break traveltimes.

12. The method of claim 7, wherein determining long-period statics includes:
determining the penetration depth of the refracted wave based on the determined apparent velocity.

13. The method of claim 12, wherein determining the penetration depth comprises:
determining the penetration according to the following relation:

$$Z(V_i^R) = \frac{1}{\pi} \sum_{j=0}^{i} \cosh^{-1}\{V_j^R / V_i^R\}(X_{j+1} - X_j),$$

where the value of $Z(V_i^R)$ for all offset subranges form a velocity/depth function beneath a given surface point and represent a near-surface model estimate.

14. The method of claim 7, wherein determining long-period statics includes:
forming a sequential estimation of layer thickness of layers in the model.

15. The method of claim 14, wherein forming a sequential estimation of layer thickness $\Delta Z(V_i^R)$ for a layer i according to the following relation:

$$\Delta Z(V_i^R) = \frac{\Delta \tau_i^R \cdot V_i^R}{\sqrt{1 - \frac{V_i^R}{V_{i+1}^R}}}$$

where $\Delta \tau_i^R = \tau_{i+1}^R - \tau_i^R$.

16. A method of seismic surveying to obtain seismic data with reduced effects on static in the data, comprising:
imparting seismic energy into the earth from at least one source position;
obtaining seismic data from the response of subsurface earth formations to the seismic energy;
forming traveltime/offset functions for the seismic stations from first-arrival picks obtained from the data;
transforming the traveltime/offset functions into velocity/depth functions to derive a near-surface model;
determining long-period statics in the data from the derived near-surface model; and
removing the determined long-period statics from the seismic data.

17. The method of claim 16, wherein imparting seismic energy comprises:
imparting seismic energy into the earth from at least one sonic position to travel at least in part as refraction seismic waves.

18. A method of processing seismic data obtained during a seismic survey from a plurality of seismic stations to remove the effect of statics from the data, comprising:
obtaining first-arrival picks from the seismic data;
forming traveltime/offset functions for the seismic stations from first-arrival picks;
transforming the traveltime/offset functions into velocity/depth functions to derive a near-surface model;
determining long-period statics in the data from the derived near-surface model; and
removing the determined long-period statics from the seismic data.

19. The method of claim 18, wherein imparting seismic energy comprises:
imparting seismic energy into the earth from at least one sonic position to travel at least in part as refraction seismic waves.

20. The method of claim 18, further including:
forming a display of the seismic data after removing the determined long-period statics.

21. A method of processing seismic data obtained during a seismic survey from a plurality of seismic stations to remove the effect of long-period and short-period statics from the data, comprising:
forming traveltime/offset functions for the seismic stations from first-arrival picks obtained from the data;
transforming the traveltime/offset functions into velocity/depth functions to derive a near-surface model; and
determining long-period statics in the data from the derived near-surface model;
performing a surface-consistent decomposition of traveltime residuals remaining after determining long-period statics;
forming an estimate of short-period statics from the surface-consistent decomposition;
removing the determined long-period statics from the seismic data; and
removing the estimates formed of the short-period statics from the seismic data.

22. The method of claim 21, further including:
forming a display of the seismic data after removing the long-period and short period statics.

* * * * *